United States Patent
Murray et al.

(10) Patent No.: US 11,443,468 B2
(45) Date of Patent: Sep. 13, 2022

(54) TRAINING AND USING AN ENSEMBLE OF COMPLIMENTARY CONVOLUTIONAL NEURAL NETWORKS FOR CROSS-DOMAIN RETRIEVAL OF FASHION ITEM IMAGES

(71) Applicant: Naver Corporation, Seongnam-si (KR)

(72) Inventors: Naila Murray, Grenoble (FR); Michal Kucer, Rochester, NY (US)

(73) Assignee: Naver Corporation

( * ) Notice: Subject to any disclaimer, the term of this patent is extended or adjusted under 35 U.S.C. 154(b) by 104 days.

(21) Appl. No.: 16/808,483

(22) Filed: Mar. 4, 2020

(65) Prior Publication Data

US 2021/0279929 A1 Sep. 9, 2021

(51) Int. Cl.
*G06K 9/00* (2022.01)
*G06T 11/60* (2006.01)
(Continued)

(52) U.S. Cl.
CPC .............. *G06T 11/60* (2013.01); *G06N 3/084* (2013.01); *G06T 7/10* (2017.01); *G06T 7/70* (2017.01);
(Continued)

(58) Field of Classification Search
CPC ...... G06N 3/0454; G06N 3/08; G06N 3/0445; G06N 3/084; G06N 5/046; G06N 3/0481; G06N 3/049; G06N 5/003; G06N 20/00; G06N 20/10; G06N 20/20; G06N 3/082; G06N 3/02; G06N 3/04; G06N 3/126; G06T 2207/20081; G06T 2207/20221; G06T 3/40; G06T 3/4046; G06T 2207/20084; G06T 17/10; G06T 2207/20104; G06T 2207/30168; G06T 7/0002; G06T 11/00; G06T 11/203; G06T 7/11; G06T 7/246;
(Continued)

(56) References Cited

U.S. PATENT DOCUMENTS

2018/0322623 A1* 11/2018 Memo ................ G06T 7/0004
2020/0125925 A1* 4/2020 Wang .................... G06N 3/08
(Continued)

OTHER PUBLICATIONS

Csurka, Gabriella, Christopher R Dance, Lixin Fan, Jutta Willamowski, and Cédric Bray. 'Visual Categorization with Bags of Keypoints', n.d., 16. 2018 2018.
(Continued)

*Primary Examiner* — Quan M Hua
(74) *Attorney, Agent, or Firm* — Michael J. Nickerson; Basch & Nickerson LLP (57) ABSTRACT

A method and system generate an ensemble image representation for cross-domain retrieval of a fashion item image from a database by using a three-stream Siamese triplet loss trained convolutional neural network to generate a first retrieval descriptor corresponding to an inputted query image; using an average precision loss trained convolutional neural network to generate a second retrieval descriptor corresponding to the inputted query image; concatenating both the first retrieval descriptor and the second retrieval descriptor; and $l_2$-normalizing the concatenated result to generate the ensemble image representation. During a first stage of the method and system, database items are cropped using a trained fine-grained fashion item detector.

15 Claims, 9 Drawing Sheets

(51) Int. Cl.
G06T 7/70 (2017.01)
G06N 3/08 (2006.01)
G06T 7/10 (2017.01)
(52) U.S. Cl.
CPC .............. G06T 2207/20084 (2013.01); G06T 2210/22 (2013.01)
(58) Field of Classification Search
CPC .... G06K 9/4628; G06K 9/6256; G06K 9/629; G06K 9/00228; G06K 9/6269; G06K 9/00288
See application file for complete search history.

(56) References Cited

U.S. PATENT DOCUMENTS

2020/0193245 A1* 6/2020 Divakaran ............. G06V 10/82
2020/0357143 A1* 11/2020 Chiu ..................... G06F 16/583

OTHER PUBLICATIONS

Gajic, B., and R. Baldrich. 'Cross-Domain Fashion Image Retrieval'. In 2018 IEEE/CVF Conference on Computer Vision and Pattern Recognition Workshops (CVPRW), 1950-19502, 2018. https://doi.org/10.1109/CVPRW.2018.00243. 2018.

Gordo, Albert, Jon Almazan, Jerome Revaud, and Diane Larlus. 'End-to-End Learning of Deep Visual Representations for Image Retrieval'. ArXiv:1610.07940 [Cs], Oct. 25, 2016. http://arxiv.org/abs/1610.07940. 2016.

He, Kaiming, Georgia Gkioxari, Piotr Dollár, and Ross Girshick. 'Mask R-CNN'. ArXiv:1703.06870 [Cs], Mar. 20, 2017. http://arxiv.org/abs/1703.06870. 2017.

He, Kaiming, Xiangyu Zhang, Shaoqing Ren, and Jian Sun. 'Deep Residual Learning for Image Recognition'. In 2016 IEEE Conference on Computer Vision and Pattern Recognition (CVPR), 770-78. Las Vegas, NV, USA: IEEE, 2016. https://doi.org/10.1109/CVPR.2016.90. 2016.

He, Kun, Yan Lu, and Stan Sclaroff. 'Local Descriptors Optimized for Average Precision', n.d., 10. 2016.

Huang, J., R. Feris, Q. Chen, and S. Yan. 'Cross-Domain Image Retrieval with a Dual Attribute-Aware Ranking Network'. In 2015 IEEE International Conference on Computer Vision (ICCV), 1062-70, 2015. https://doi.org/10.1109/ICCV.2015.127. 2015.

Ji, Xin, Wei Wang, Meihui Zhang, and Yang Yang. 'Cross-Domain Image Retrieval with Attention Modeling'. In Proceedings of the 2017 ACM on Multimedia Conference—MM '17, 1654-62. Mountain View, California, USA: ACM Press, 2017. https://doi.org/10.1145/3123266.3123429. 2017.

Jiang, Shuhui, Yue Wu, and Yun Fu. 'Deep Bi-Directional Cross-Triplet Embedding for Cross-Domain Clothing Retrieval'. In Proceedings of the 2016 ACM on Multimedia Conference—MM '16, 52-56. Amsterdam, The Netherlands: ACM Press, 2016. https://doi.org/10.1145/2964284.2967182. 2016.

Kiapour, M. Hadi, Xufeng Han, Svetlana Lazebnik, Alexander C. Berg, and Tamara L. Berg. 'Where to Buy It: Matching Street Clothing Photos in Online Shops'. In 2015 IEEE International Conference on Computer Vision (ICCV), 3343-51. Santiago, Chile: IEEE, 2015. https://doi.org/10.1109/ICCV.2015.382. 2015.

Krizhevsky, Alex, Ilya Sutskever, and Geoffrey E Hinton. 'ImageNet Classification with Deep Convolutional Neural Networks'. In Advances in Neural Information Processing Systems 25, edited by F. Pereira, C. J. C. Burges, L. Bottou, and K. Q. Weinberger, 1097-1105. Curran Associates, Inc., 2012. http://papers.nips.cc/paper/4824-imagenet-classification-with-deep-convolutional-neural-networks.pdf. 2012.

Lin, Tsung-Yi, Piotr Dollár, Ross Girshick, Kaiming He, Bharath Hariharan, and Serge Belongie. 'Feature Pyramid Networks for Object Detection'. ArXiv:1612.03144 [Cs], Dec. 9, 2016. http://arxiv.org/abs/1612.03144. 2016.

Liu, Ziwei, Ping Luo, Shi Qiu, Xiaogang Wang, and Xiaoou Tang. 'DeepFashion: Powering Robust Clothes Recognition and Retrieval with Rich Annotations'. In 2016 IEEE Conference on Computer Vision and Pattern Recognition (CVPR), 1096-1104. Las Vegas, NV, USA: IEEE, 2016. https://doi.org/10.1109/CVPR.2016.124. 2016.

Lowe, D.G. 'Object Recognition from Local Scale-Invariant Features'. In Proceedings of the Seventh IEEE International Conference on Computer Vision, 1150-57 vol. 2. Kerkyra, Greece: IEEE, 1999. https://doi.org/10.1109/ICCV.1999.790410. 1999.

Melekhov, Iaroslav, Juho Kannala, and Esa Rahtu. 'Siamese Network Features for Image Matching'. In 2016 23rd International Conference on Pattern Recognition (ICPR), 378-83. Cancun: IEEE, 2016. https://doi.org/10.1109/ICPR.2016.7899663. 2016.

Paszke, Adam, Sam Gross, Soumith Chintala, Gregory Chanan, Edward Yang, Zachary DeVito, Zeming Lin, Alban Desmaison, Luca Antiga, and Adam Lerer. 'Automatic Differentiation in PyTorch', n.d., 4. 2018.

Perronnin, F., and C. Dance. 'Fisher Kernels on Visual Vocabularies for Image Categorization'. In 2007 IEEE Conference on Computer Vision and Pattern Recognition, 1-8, 2007. https://doi.org/10.1109/CVPR.2007.383266. 2007.

Perronnin, F., Y. Liu, J. Sánchez, and H. Poirier. 'Large-Scale Image Retrieval with Compressed Fisher Vectors'. In 2010 IEEE Computer Society Conference on Computer Vision and Pattern Recognition, 3384-91, 2010. https://doi.org/10.1109/CVPR.2010.5540009. 2010.

Radenović, F., G. Tolias, and O. Chum. 'Fine-Tuning CNN Image Retrieval with No Human Annotation'. IEEE Transactions on Pattern Analysis and Machine Intelligence 41, No. 7 (Jul. 2019): 1655-68. https://doi.org/10.1109/TPAMI.2018.2846566. 2019.

Razavian, Ali Sharif, Hossein Azizpour, Josephine Sullivan, and Stefan Carlsson. 'CNN Features Off-the-Shelf: An Astounding Baseline for Recognition'. ArXiv:1403.6382 [Cs], Mar. 23, 2014. http://arxiv.org/abs/1403.6382. 2014.

Revaud, Jerome, Jon Almazan, Rafael Sampaio de Rezende, and Cesar Roberto de Souza. 'Learning with Average Precision: Training Image Retrieval with a Listwise Loss'. ArXiv: 1906.07589 [Cs], Jun. 18, 2019. http://arxiv.org/abs/1906.07589 2019.

Ustinova, Evgeniya, and Victor Lempitsky. 'Learning Deep Embeddings with Histogram Loss'. In Advances in Neural Information Processing Systems 29, edited by D. D. Lee, M. Sugiyama, U. V. Luxburg, I. Guyon, and R. Garnett, 4170-4178. Curran Associates, Inc., 2016. http://papers.nips.cc/paper/6464-learning-deep-embeddings-with-histogram-loss.pdf 2016.

Wang, Xi, Zhenfeng Sun, Wenqiang Zhang, Yu Zhou, and Yu-Gang Jiang. 'Matching User Photos to Online Products with Robust Deep Features'. In Proceedings of the 2016 ACM on International Conference on Multimedia Retrieval—ICMR'16, 7-14. New York, New York, USA: ACM Press, 2016. https://doi.org/10.1145/2911996.2912002. 2016.

Wang, Z., Y. Gu, Y. Zhang, J. Zhou, and X. Gu. 'Clothing Retrieval with Visual Attention Model'. In 2017 IEEE Visual Communications and Image Processing (VCIP), 1-4, 2017. https://doi.org/10.1109/VCIP.2017.8305144 2017.

Wu, Chao-Yuan, R. Manmatha, Alexander J. Smola, and Philipp Krahenbuhl. 'Sampling Matters in Deep Embedding Learning'. In 2017 IEEE International Conference on Computer Vision (ICCV), 2859-67. Venice: IEEE, 2017. https://doi.org/10.1109/ICCV.2017.309 2017.

Xiong, Y., N. Liu, Z. Xu, and Y. Zhang. 'A Parameter Partial-Sharing CNN Architecture for Cross-Domain Clothing Retrieval'. In 2016 Visual Communications and Image Processing (VCIP), 1-4, 2016. https://doi.org/10.1109/VCIP.2016.7805463 2016.

Zhang, Yanhao, Pan Pan, Yun Zheng, Kang Zhao, Yingya Zhang, Xiaofeng Ren, and Rong Jin. 'Visual Search at Alibaba'. In Proceedings of the 24th ACM SIGKDD International Conference on Knowledge Discovery & Data Mining—KDD '18, 993-1001. London, United Kingdom: ACM Press, 2018. https://doi.org/10.1145/3219819.3219820 2018.

Zheng, Shuai, Fan Yang, M. Hadi Kiapour, and Robinson Piramuthu. 'ModaNet: A Large-Scale Street Fashion Dataset with Polygon Annotations'. In 2018 ACM Multimedia Conference on Multimedia Conference—MM '18, 1670-78. Seoul, Republic of Korea: ACM Press, 2018. https://doi.org/10.1145/3240508.3240652 2018.

* cited by examiner

TABLE 1

| | metric | Tri DB F | Tri DB C | mAP DB F | mAP DB C | Tri | mAP | Full | Cmp. |
|---|---|---|---|---|---|---|---|---|---|
| bags | mAP | 0.1819 | 0.1928 | 0.2262 | 0.1914 | 0.2063 | 0.2238 | 0.2684 | 0.2239 |
| | Acc@1 | 0.2318 | 0.3044 | 0.3309 | 0.2908 | 0.3022 | 0.3237 | 0.3813 | 0.3597 |
| | Acc@20 | 0.6115 | 0.5612 | 0.6115 | 0.5827 | 0.6043 | 0.6491 | 0.6619 | 0.6259 |
| belts | mAP | 0.0674 | 0.0809 | 0.0778 | 0.0874 | 0.1024 | 0.1072 | 0.1005 | 0.0942 |
| | Acc@1 | 0.0714 | 0.0952 | 0.0476 | 0.1198 | 0.1429 | 0.1429 | 0.1190 | 0.0952 |
| | Acc@20 | 0.3571 | 0.3095 | 0.2857 | 0.3810 | 0.3810 | 0.3333 | 0.3571 | 0.4286 |
| dresses | mAP | 0.4392 | 0.4644 | 0.4386 | 0.4253 | 0.4866 | 0.4548 | 0.5091 | 0.4954 |
| | Acc@1 | 0.5166 | 0.5208 | 0.4834 | 0.4984 | 0.5403 | 0.5176 | 0.5606 | 0.5440 |
| | Acc@20 | 0.7162 | 0.7159 | 0.6674 | 0.6593 | 0.7302 | 0.6806 | 0.7407 | 0.7204 |
| eyewear | mAP | 0.2223 | 0.2084 | 0.1167 | 0.2371 | 0.2189 | 0.2055 | 0.1723 | 0.2671 |
| | Acc@1 | 0.2386 | 0.2241 | 0.1579 | 0.3103 | 0.2586 | 0.2586 | 0.2869 | 0.3621 |
| | Acc@20 | 0.7069 | 0.8621 | 0.5862 | 0.8793 | 0.7759 | 0.6724 | 0.6897 | 0.9138 |
| footwear | mAP | 0.1301 | 0.1048 | 0.0719 | 0.0749 | 0.1294 | 0.0803 | 0.1382 | 0.1103 |
| | Acc@1 | 0.1539 | 0.1384 | 0.0819 | 0.1052 | 0.1608 | 0.0863 | 0.1573 | 0.1478 |
| | Acc@20 | 0.4048 | 0.3671 | 0.2204 | 0.2453 | 0.4103 | 0.2464 | 0.3771 | 0.3416 |
| hats | mAP | 0.2109 | 0.2957 | 0.1680 | 0.2761 | 0.2765 | 0.2574 | 0.2219 | 0.3274 |
| | Acc@1 | 0.2080 | 0.2815 | 0.2080 | 0.2462 | 0.2462 | 0.2308 | 0.2462 | 0.3077 |
| | Acc@20 | 0.7077 | 0.7077 | 0.5077 | 0.6769 | 0.7077 | 0.6769 | 0.7231 | 0.7077 |
| leggings | mAP | 0.1130 | 0.1563 | 0.1573 | 0.1606 | 0.1510 | 0.1705 | 0.1875 | 0.1818 |
| | Acc@1 | 0.1510 | 0.1760 | 0.1852 | 0.1937 | 0.1681 | 0.1944 | 0.2251 | 0.2051 |
| | Acc@20 | 0.4758 | 0.4729 | 0.3533 | 0.3789 | 0.5071 | 0.3734 | 0.4843 | 0.4400 |
| outerwear | mAP | 0.2088 | 0.2241 | 0.2645 | 0.2497 | 0.2323 | 0.2739 | 0.2771 | 0.2886 |
| | Acc@1 | 0.2348 | 0.2538 | 0.3018 | 0.2835 | 0.2538 | 0.3079 | 0.2988 | 0.3049 |
| | Acc@20 | 0.4329 | 0.4482 | 0.4726 | 0.4451 | 0.4634 | 0.4695 | 0.4909 | 0.4787 |
| pants | mAP | 0.2081 | 0.2626 | 0.2351 | 0.2484 | 0.2341 | 0.2580 | 0.2510 | 0.2817 |
| | Acc@1 | 0.2727 | 0.3333 | 0.2727 | 0.2727 | 0.2879 | 0.3030 | 0.2727 | 0.3333 |
| | Acc@20 | 0.4091 | 0.5000 | 0.3788 | 0.4848 | 0.4545 | 0.4242 | 0.4091 | 0.5152 |
| skirts | mAP | 0.5420 | 0.5862 | 0.5433 | 0.5829 | 0.5468 | 0.5836 | 0.5880 | 0.6231 |
| | Acc@1 | 0.6093 | 0.6320 | 0.5711 | 0.6294 | 0.6294 | 0.5998 | 0.6142 | 0.6802 |
| | Acc@20 | 0.7919 | 0.7944 | 0.7716 | 0.7741 | 0.7970 | 0.7944 | 0.8173 | 0.8020 |
| tops | mAP | 0.3187 | 0.2626 | 0.3468 | 0.3265 | 0.3574 | 0.3600 | 0.4060 | 0.3687 |
| | Acc@1 | 0.3639 | 0.3425 | 0.3945 | 0.3777 | 0.4021 | 0.4128 | 0.4480 | 0.4266 |
| | Acc@20 | 0.5734 | 0.5933 | 0.6147 | 0.5765 | 0.6101 | 0.6009 | 0.6407 | 0.6162 |
| average | mAP | 0.2629 | 0.2614 | 0.2389 | 0.2608 | 0.2703 | 0.2704 | 0.2819 | 0.2967 |
| | Acc@1 | 0.2984 | 0.2988 | 0.2734 | 0.3015 | 0.3082 | 0.3084 | 0.3209 | 0.3442 |
| | Acc@20 | 0.5625 | 0.5757 | 0.4972 | 0.5531 | 0.5856 | 0.5398 | 0.5811 | 0.6036 |

FIGURE 8

TABLE 2

| Categories | Single model | | | Per-category |
|---|---|---|---|---|
| | Model 1 | Single Model | Ensemble Model | Model 2 |
| Bags | 46.6 | 56.1 | 62.6 | 37.4 |
| Belts | 20.2 | 31.0 | 42.9 | 13.5 |
| Dresses | 56.9 | 71.6 | 72.0 | 37.1 |
| Eyewear | 13.8 | 86.2 | 91.4 | 35.5 |
| Footwear | 13.1 | 36.7 | 34.2 | 9.6 |
| Hats | 24.4 | 70.8 | 70.8 | 38.4 |
| Leggings | 15.9 | 47.3 | 49.0 | 22.1 |
| Outerwear | 20.3 | 44.8 | 47.9 | 21.0 |
| Pants | 22.3 | 50.0 | 51.5 | 29.2 |
| Skirts | 50.8 | 79.4 | 80.2 | 54.6 |
| Tops | 48.0 | 59.3 | 61.6 | 38.1 |
| Average | 30.2 | 57.6 | 60.4 | 30.6 |

FIGURE 9

TABLE 3

| Categories | Model 3 | Model 4 | Model 5 | Model 6 |
|---|---|---|---|---|
| Dresses | 0.621 | 0.571 | 0.583 | 0.716 |
| Outerwear | N/A | 0.500 | 0.509 | 0.448 |
| Skirts | 0.709 | 0.736 | 0.723 | 0.794 |
| Tops | 0.523 | 0.467 | 0.470 | 0.593 |

FIGURE 10

TRAINING AND USING AN ENSEMBLE OF COMPLIMENTARY CONVOLUTIONAL NEURAL NETWORKS FOR CROSS-DOMAIN RETRIEVAL OF FASHION ITEM IMAGES

BACKGROUND

E-commerce has become a popular alternative to shopping in brick-and-mortar stores. More recently, applications (cross-domain image retrieval applications) have allowed customers to search for items using images taken by the customers' smartphones. An example of a cross-domain image retrieval application retrieves a database image from a shop (one domain) using a query image from the user (another domain). The two domains are different because shop images are usually taken in studio conditions by professionals while user images are taken by amateur users in a wide variety of different environments. Searching for items using query images taken by the customers' smartphones in a shopping domain enables the customer to retrieve and purchase items similar or identical to the user's query image.

Traditional approaches to image retrieval typically adopt the following procedure: (i) extract local image feature descriptors (e.g. scale-invariant feature transform (SIFT); (ii) embed the local image feature descriptors into a high-dimensional space using encoding techniques such as Bag-of-Visual-Words (BoVW), or Fisher Vectors (FV); (iii) aggregate the local image feature descriptors to produce a fixed-length global representation; and (iv) apply a metric between representations to measure relevance.

In another approach, image representations using pre-trained convolutional neural networks have been utilized in image retrieval. Moreover, with classification fine-tuning, the quality of the convolutional neural network features can be improved, thereby increasing suitability for image retrieval.

Other approaches formulate image retrieval as a ranking problem and use an appropriate loss to optimize the order in which the images appear with respect to a query. These approaches typically use two-stream or three-stream Siamese network architectures, combined with pairwise, triplet or n-tuplet losses, to train representations in an end-to-end manner. However, these approaches often require setting appropriate margins and using sophisticated hard-negative mining techniques.

A further approach has used alternative loss functions based on optimizing for evaluation metrics such as average precision (AP) on retrieval tasks, including instance-level image retrieval.

With respect to the conventional cross-domain image retrieval applications mentioned above, some conventional cross-domain image retrieval applications focused on retrieving "similar" clothing by collecting sets of images labeled with various clothing-related attributes. However, while such conventional approaches have defined the similarity between two images as the number of high-level attributes in common, defining clothing similarity more rigorously is challenging.

More specifically, to achieve exact street-to-shop clothing image retrieval, where the goal is to retrieve "shop" images that contain the exact item shown in the query image, a more rigorous defining of clothing similarity is needed.

One approach to defining clothing similarity uses a multi-layer perceptron (MLP) to learn a similarity measure between the "street" and "shop" image descriptors by minimizing the cross-entropy loss over pairs of convolutional neural network features which consist of street and shop images with matching or non-matching product identifications. To remove background clutter, this approach uses a selective search to generate high-confidence region proposals to remove background clutter.

Another approach uses a Siamese network architecture optimized simultaneously with a robust contrastive loss for image retrieval, and a cross-entropy loss to regularize the network by predicting the 21,841 fine-grained categories of the images in the ImageNet dataset.

A further approach optimizes image representations for retrieval by using the triplet loss. In this approach, a dual attribute-aware ranking network (DARN), consisting of two networks each adapted to its specific image domain—"street" user images or shop images—is utilized. The networks are used both for predicting semantic image attributes and image retrieval. Each image is first pre-cropped with a foreground clothing detector, after which the images are fed into the DARN network, which uses both the softmax loss to optimize attribute prediction and the triplet loss to align the representations of images containing the same product. To remove background clutter, this approach uses selective search and an R-CNN model to crop clothing from images using humans as cues, without considering clothing categories.

The FashionNet model jointly optimizes objectives for landmark prediction, category and attribute classification, and retrieval. The FashionNet model first predicts the clothing landmarks, which are used to pool and/or gate local features over estimated clothing landmarks. The local features are concatenated with features from the whole clothing image for joint prediction of categories, attributes, and retrieval (learned by optimizing the triplet loss). To remove background clutter, this approach explores variations of the FashionNet model in which the approach compares, using fashion landmark regression, human joint detection, or body part detection to gate and/or pool features from an image.

Another approach uses a bi-directional cross-triplet embedding for the task of cross-domain retrieval. More specifically, the approach breaks down the triplet loss and assigns different weights to intra-domain and cross-domain losses. The network is fine-tuned for each category separately, with the convolutional layers being frozen, and only the last three fully-connected layers being fine-tuned with the proposed loss.

A further approach utilizes a network architecture which uses an attention mechanism to bias the pooling across the spatial regions, with different sub-networks for street and shop images.

Lastly, another approach trains a three column Siamese network using the triplet loss, in which the approach separates the streams, according to whether the streams belong to the street set or the shop set, adapting the weights for each domain individually.

Fashion item retrieval using images provided by consumers as queries is particularly challenging due to the significant domain gap between the photos used by the customer (buyer) and photos taken by the retailer (seller). This domain gap arises because photos from retailers tend to be of much higher quality, in terms of lighting, resolution, and visual simplicity (e.g. with respect to clutter and occlusions).

Another challenge is that fashion items such as clothing are highly deformable, such that their appearance exhibits high intra-instance variation. Due to these challenges, it is typical to improve the accuracy of methods for Street-to-Shop image retrieval by training domain-specific models or training one model per fashion item category, wherein it is assumed that the category of each database and query item is known and, for a given query image, the appropriate domain-specific image retrieval model for that category is used.

These retrieval models are trained to generate representations for images that, when compared using a simple metric such as the cosine similarity, reflect the similarity of the image content. The image database is therefore stored as a set of image representations extracted from the trained model. Using one model per category requires storing and maintaining multiple models, which is not desirable.

Thus, it is desirable to provide a cross-domain image retrieval model, which outperforms per-category or domain-specific models while using one model for all categories and for both query and database images.

It is further desirable to provide a cross-domain image retrieval model, which uses a detection model for fine-grained clothing item detection to reduce ambiguity in the retrieval objective.

Also, it is desirable to provide a cross-domain image retrieval model that is trained using both the standard triplet loss and the average precision (AP) loss.

BRIEF DESCRIPTION OF THE DRAWINGS

The drawings are only for purposes of illustrating various embodiments and are not to be construed as limiting, wherein:

FIG. 8 illustrates a table showing comparison of the mAP, Top-1, and Top-20 retrieval accuracy for the Exact Street2Shop dataset;

DETAILED DESCRIPTION OF THE DRAWINGS

For a general understanding, reference is made to the drawings. In the drawings, like references have been used throughout to designate identical or equivalent elements. It is also noted that the drawings may not have been drawn to scale and that certain regions may have been purposely drawn disproportionately so that concepts may be properly illustrated.

Figure 1:
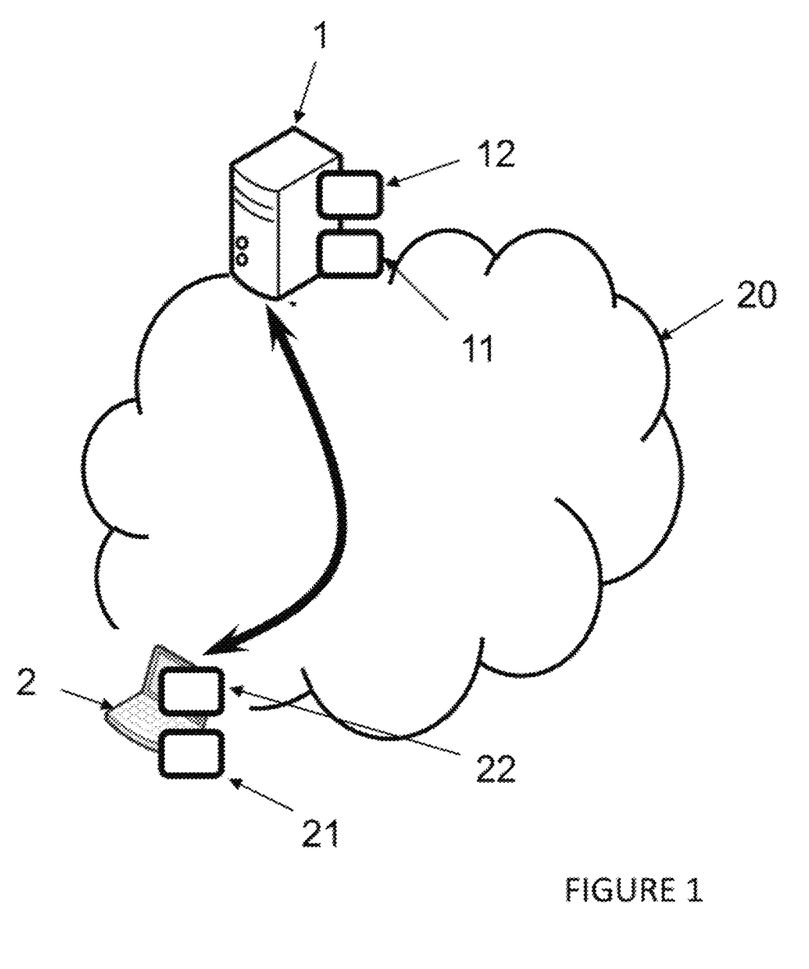
FIG. 1 illustrates an example of architecture of a system for retrieving cross-domain images.

FIG. 1 illustrates a system architecture, which can be used in implementing cross-domain image retrieval, by means of a server 1 and/or a client 2.

Each of these devices 1, 2 are typically connected to an extended network 20 such as the Internet for data exchange. Each one comprises data processors 11, 21, and optionally memory 12, 22 such as a hard disk.

More precisely, the user generally owns a client device 2 of the smartphone type, for inputting an image and a request for image retrieval. The request may be either directly processed by the client 2, or transmitted to the server 1 for being processed there. The described methodology is not limited to any specific implementation.

In the detect-then-retrieve approach described below, it is assumed that (1) the ground-truth fashion item categories are known for both query and database images; (2) the ground-truth bounding box for the query image is provided by a motivated user of the service; and (3) the ground-truth bounding box for database images are unknown.

To achieve the detect-then-retrieve approach, a two-stage pipeline is utilized: (1) clothing item detection and (2) clothing item retrieval.

Figure 2:
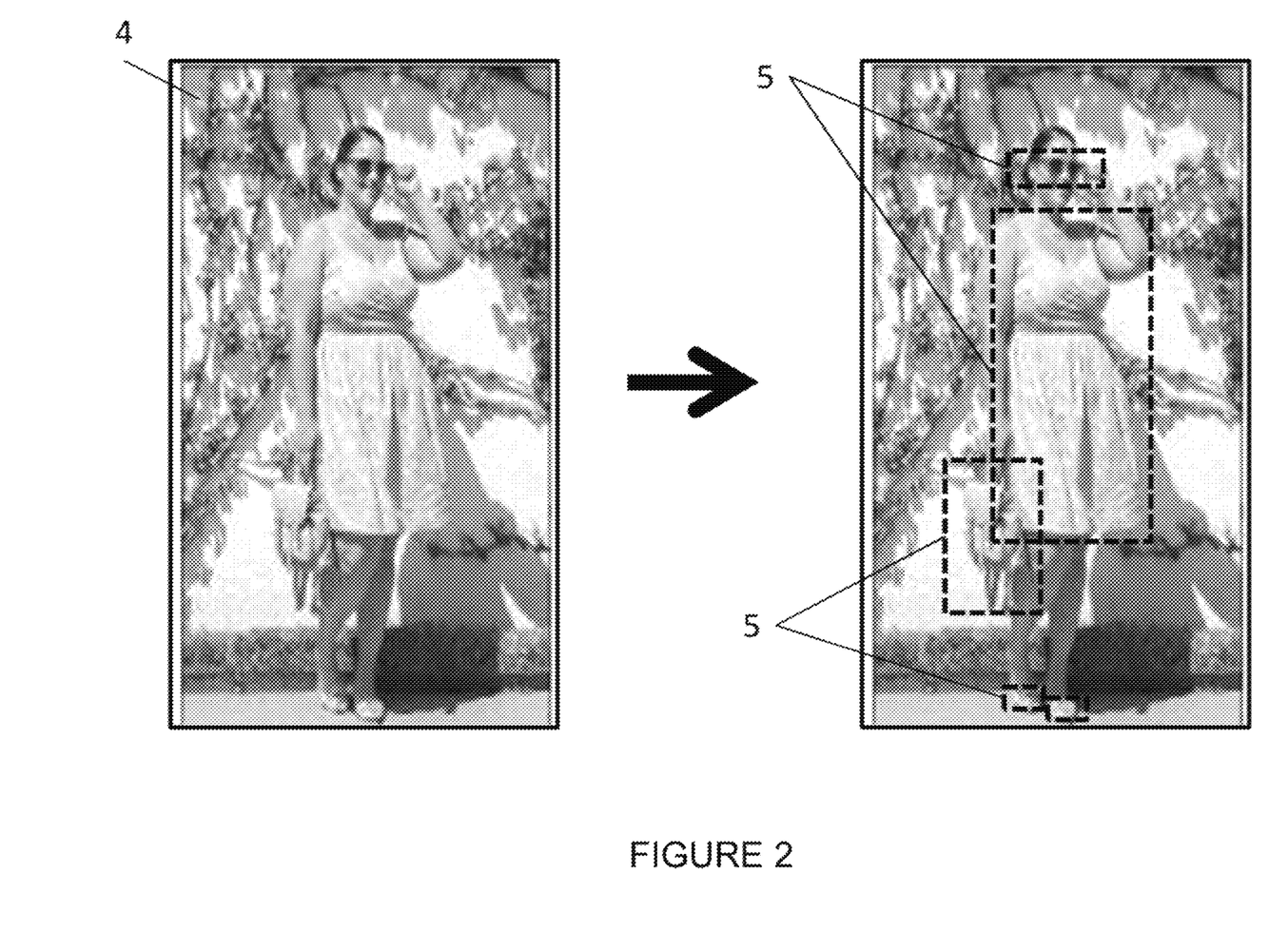
FIGS. 2 and 3 illustrate a graphical representation of a cross-domain image retrieval process.
Figure 3:
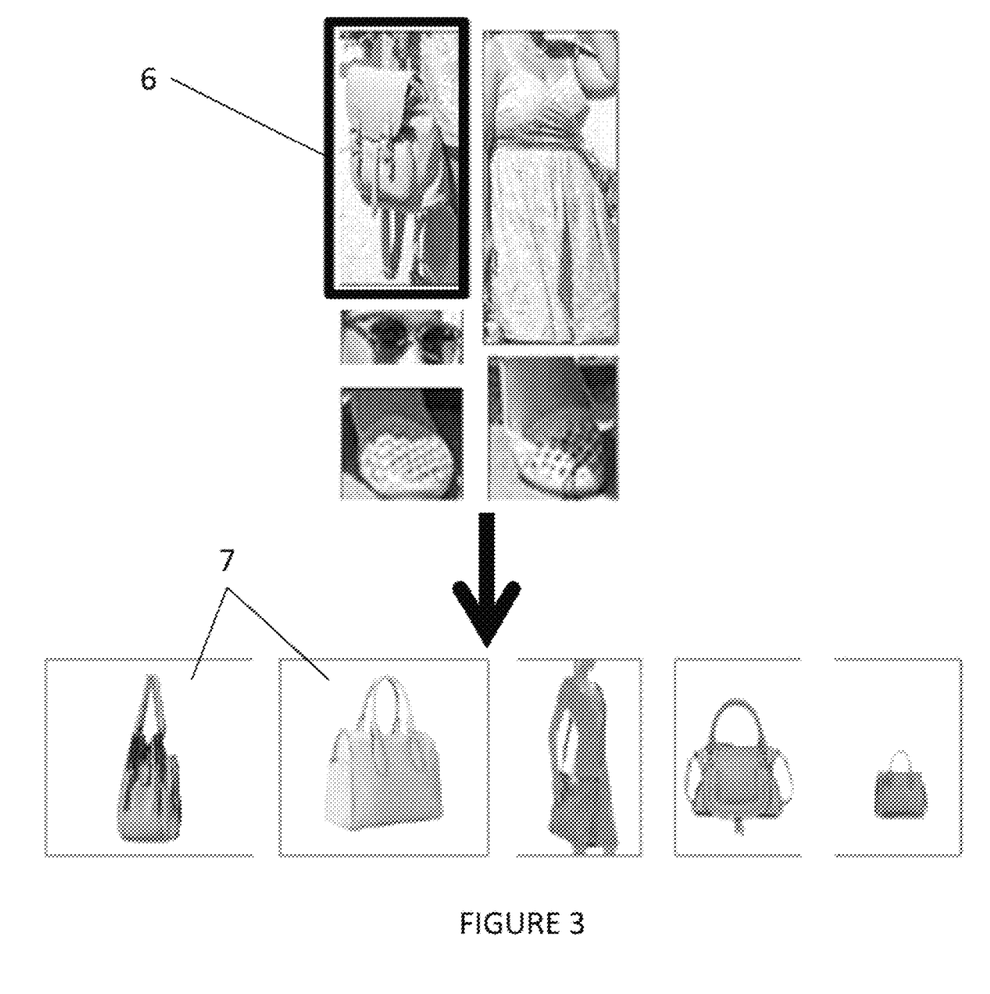

More specifically, as illustrated in FIGS. 2 and 3, the detect-then-retrieve approach consists of two steps: detection and retrieval. As illustrated in FIG. 2, the query image 4, along with the desired clothing category (not shown) is passed into a clothing detection model to generate clothing detection proposals (bounding boxes) 5.

As illustrated in FIG. 3, the bounding box 6, whose category matches the desired category is selected, and is then passed into the retrieval model. The retrieval model computes the image embedding used for shop image retrieval 7.

To realize this detect-then-retrieve approach, a clothing item detector is trained using the Mask R-CNN detection architecture. The clothing item detector is trained to detect different clothing categories, as opposed to detecting one generic "clothing" category. Once trained, the clothing item detector is applied to all database images.

To obtain a single crop for each image, the image is first fed into the clothing item detector to produce a set of detection proposals. Each proposal has an objectness score and a predicted category. The proposals are filtered to keep only those proposals with an objectness score greater than 0.5 and that have been categorized as belonging to the ground-truth category for that image.

From this filtered list, the proposal with the highest category score is selected. If the filtering process produces no proposals (i.e.; if there are no proposals with an objectness score greater than 0.5 that have been predicted as belonging the ground-truth category for that image), the bounding box is set to be the whole image. The resultant bounding box is then used to crop the database image.

In the clothing item retrieval phase, the baseline retrieval architecture is based on the end-to-end RMAC pipeline. ResNet50 is used as the baseline feature extractor $f_\theta$, which generates a feature map $X=[x_1; \ldots ; x_k]$, where $x_i \in \mathbb{R}^N$ is the feature descriptor of the image I at the spatial location i. To aggregate the various descriptors, R-MAC pooling is replaced with Generalized Mean (GeM) pooling, as set forth below, $$x = \left( \frac{1}{k} \sum_{i=1}^{k} (x_i)^p \right)^{\frac{1}{p}}$$

to obtain a single descriptor for each image. The descriptor is then fed through an $l_2$ normalization layer, a fully connected layer, and another $l_2$ normalization layer, to produce the final embedding $x_I=f_\theta(I)$, where I is the query or the database image, $f_\theta$ is a parametric function that computes the image embedding, and $\theta$ are the trainable parameters of f.

Figure 4:
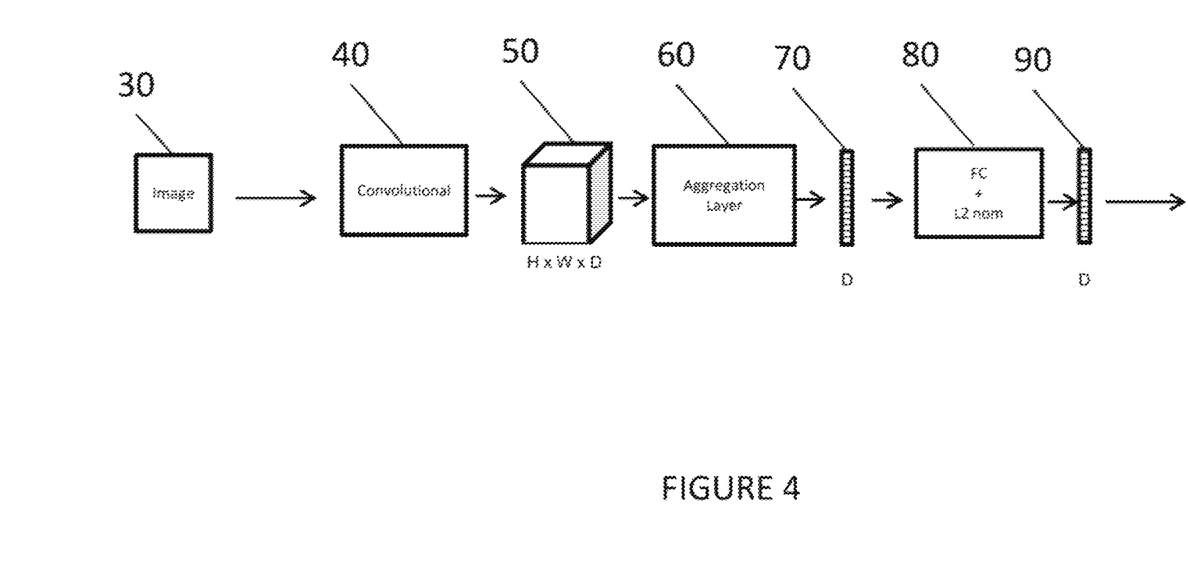
FIG. 4 illustrates a block diagram of a neural network used for training.

FIG. 4 illustrates a block diagram of a neural network used in the training process for retrieving cross-domain images. As illustrated in FIG. 4, the neural network is a convolutional neural network wherein a query image 30 is fed. The convolutional neural network includes convolution layers 40, convolutional features maps 50, pooling (aggregation) layer 60, and fully connected L2 normalization layer 80.

Figure 5:
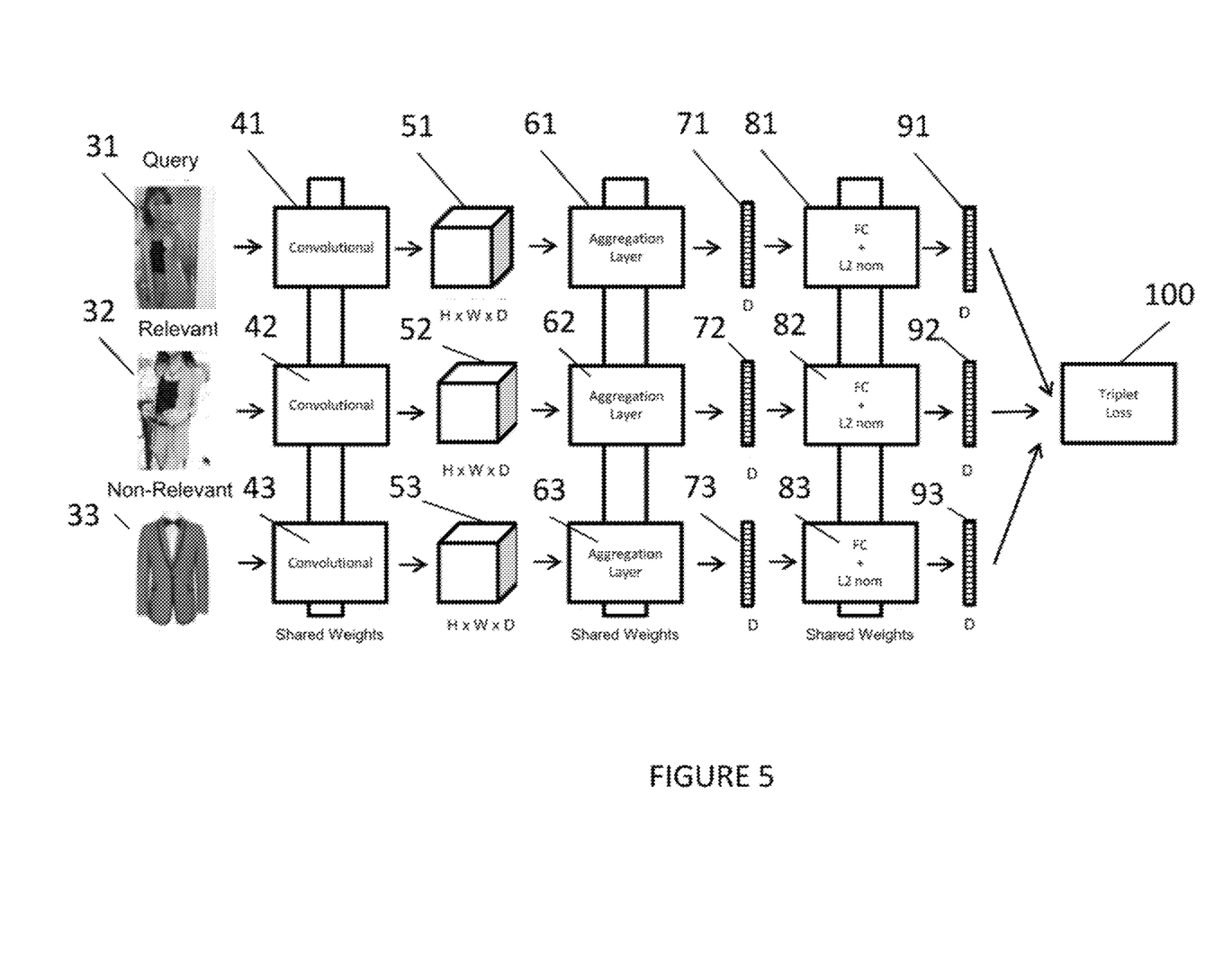
FIG. 5 illustrates a block diagram of a three-stream Siamese triplet loss network architecture used to train a neural network, as illustrated in FIG. 4, for retrieving cross-domain images.
Figure 6:
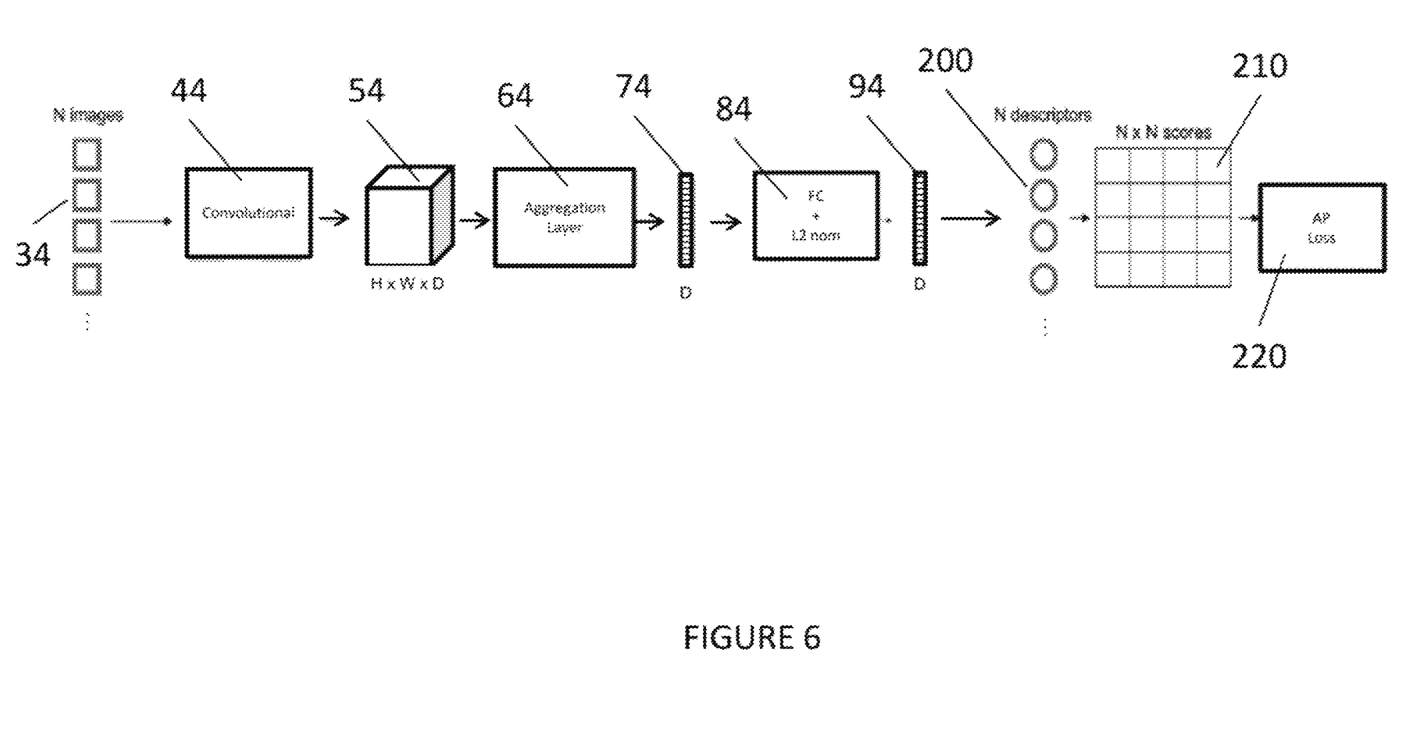
FIG. 6 illustrates a block diagram of an average precision (AP) loss network architecture used to train a neural network, as illustrated in FIG. 4, for retrieving cross-domain images.

FIGS. 5 and 6 show the schematic of the approaches used to train using the triplet loss and average precision (AP) loss functions, as will be described below.

As illustrated in FIG. 5, a three-stream Siamese network architecture is used to train a convolutional neural network, as illustrated in FIG. 4. The three-stream Siamese network architecture accepts a triplet of images: a query 31, a positive example 32 (another image with a matching product ID), and a negative example 33. As illustrated in FIG. 5, the weights are shared between all the streams.

To improve ranking performance, the three-stream Siamese network architecture is pre-trained with a classification loss. In other words, the three-stream Siamese network architecture is first optimized to predict the product ID from an image. Afterwards, the weights are optimized with the triplet loss, $$L(I_q,I^+,I^-)=\tfrac{1}{2}\max(0,m+\|q-d^+\|^2-\|q-d^-\|^2)$$

where $I_q$ and q, $I^+$ and $d^+$, and $I^-$ and $d^-$ are the image and feature descriptors for the query, positive, and negative images, respectively. This loss encourages the following property to hold: $\text{sim}(q,d^+)>\text{sim}(q,d^-)+m$.

Since the weights of the convolutional layers (41, 42, and 43) and the fully-connected layer are independent of the size of the input image, the three-stream Siamese network architecture of FIG. 5 can process images of any size and aspect ratio.

Each stream encompasses convolutional layers (41, 42, and 43) which process blocks of the image one after the other; convolutional features maps (51, 52, and 53), which is a type of activation function; pooling layers (61, 62, and 63) which allow the grouping together of several neuron activations in one single activation; and a fully connected layer that connects all the neurons of a layer with all the neurons of the preceding layer and L2 normalization layers to ensure that the dot-product between two representations is a cosine similarity (81, 82, and 83).

The convolution layers (41, 42, and 43), and the fully connected layers (81, 82, and 83) generally correspond to a scalar product between the response of the neurons of the preceding layer and the weights of the neurons of the current layer.

The number of layers, configuration, and arrangement depend on the specific backbone architecture.

In a triplet loss training process, the three-stream architecture (FIG. 5) takes image triplets as input (31, 32, and 33), where each triplet contains a query image 31, a positive image 32, and a negative image 33.

Each stream produces a compact representation for each image in the triplet, leading to the descriptors D (91, 92, and 93), respectively.

The network is trained by taking a query image and comparing it with both a positive sample and a negative sample. The dissimilarity between the query image and positive image must be low and the dissimilarity between the query image and the negative image must be high.

To achieve this, the training method computes a triplet loss from the representation of the query image, the positive image, and the negative image (31, 32, and 33). Generally, the triplet loss depends on the distance between the numeric embedding of the query image and the numeric embedding of the positive image and on the distance between the numeric embedding of the query image and the numeric embedding of the negative image.

The triplet loss L can be defined by the following formula:

$$L(I_q,I^+,I^-)=\max(0,m+q^Td^- - q^Td^+)$$

wherein m is a scalar that controls the margin. This loss ensures that the embedding of the positive image $d^+$ is closer to the embedding of the query image q than that of the negative image $d^-$, by at least a margin m.

As illustrated in FIG. 6, an average precision (AP) loss is used to optimize the average precision (AP) for each query example 34.

With respect to the average precision (AP) loss of FIG. 6, Let X be the set of all image representations and let $Q \subset X$ and $S \subset X$ be the sets of query and database representations respectively. Given a user "street" query $q \in Q$, let $S_q^+$ and $S_q^-$ be the sets of database images with matching and non-matching product identifications, respectively.

Given a list of items $r \in S_q^+ \cup S_q^-$ sorted by their increasing distance to q, average precision (AP) is defined as:

$$Prec@K = \frac{1}{K}\sum_{i=1}^{K} 1[r_i \in S_q^+]$$

$$AP = \frac{1}{\|S_q^+\|}\sum_{K=1}^{N} 1[r_k \in S_q^+] \cdot Prec@K$$

Though the AP metric cannot be directly optimized as it is non-differentiable, one can use a histogram binning approximation to obtain a differentiable loss.

As illustrated in FIG. 6, using the average precision (AP) loss involves a multi-staged network optimization. During a first stage (convolution layers 44, pooling (aggregation) layer 64, and fully connected and L2 normalization layer 84), the descriptors of all batch images are computed 94, discarding the intermediary tensors (e.g. 54 and 74) in the memory. It is noted that discarding intermediary tensors in the first stage allows for using a large batch size to compute the loss, which makes the loss computation more robust and informative.

In a second stage (210 and 220) the score matrix S ($\text{sim}(I_i,I_j)=d^T_i d_j \in [-1,1]$) and the $mAP_Q$ loss $l=L(D,Y)$ are computed. The gradient of the loss with respect to the descriptors is also computed.

During a last stage, back propagation through the convolution layers 44, pooling (aggregation) layer 64, and fully connected and L2 normalization layers 84, is performed, given the loss for a triplet computed in 220. In this stage, the intermediate tensors are stored, and the computed gradient for this descriptor is used to continue the backpropagation through the network. Gradients are accumulated, one image at a time, before finally updating the network weights.

Figure 7:
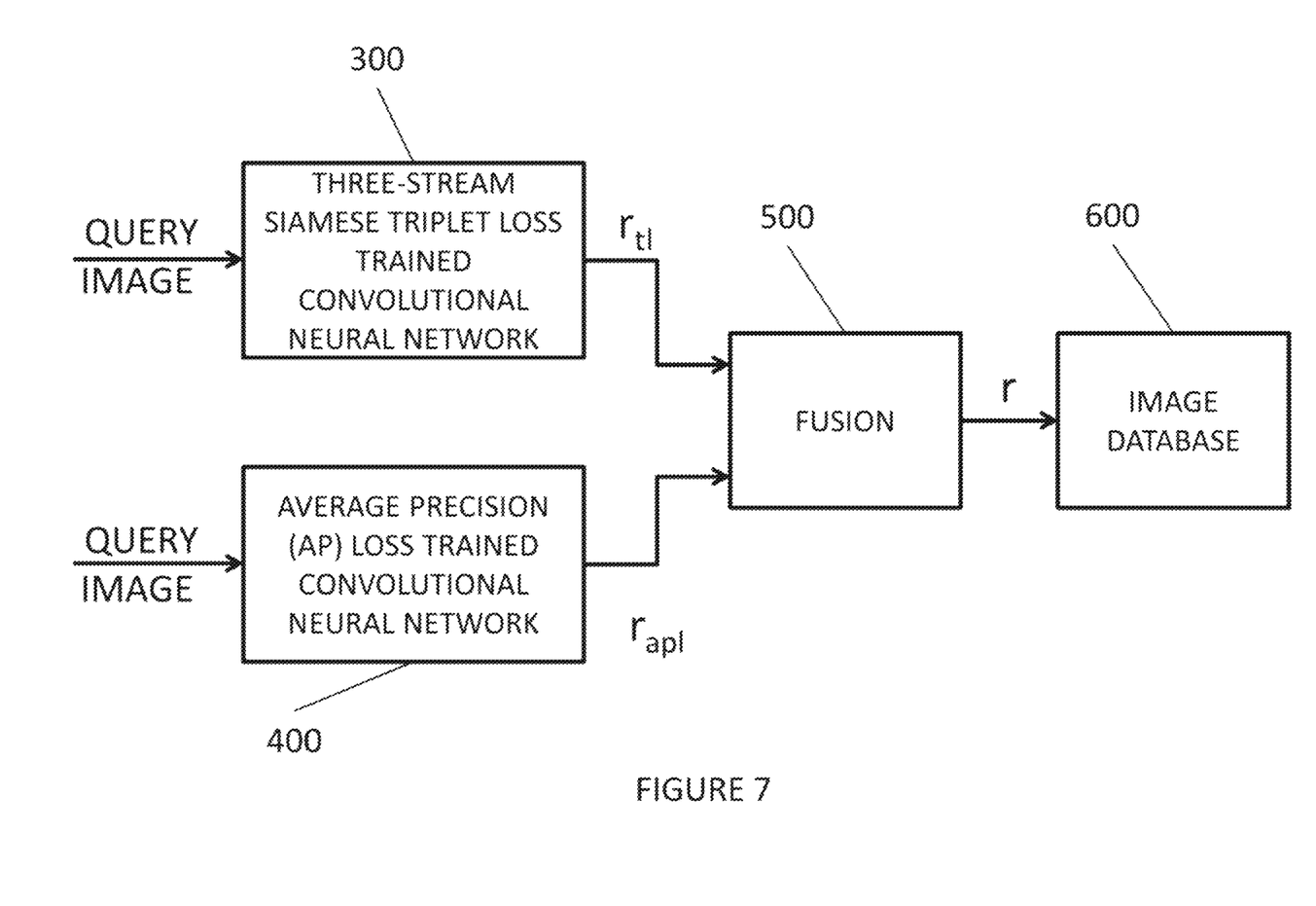
FIG. 7 illustrates a block diagram of the ensemble network of the average precision (AP) loss trained convolutional neural network and the three-stream Siamese triplet loss trained convolutional neural network.

Upon training a convolutional neural network using the three-stream Siamese network architecture of FIG. 5 and training a convolutional neural network using the average precision (AP) loss of FIG. 6, the two trained convolutional neural networks are combined as an ensemble network, as illustrated in FIG. 7.

To generate an ensemble image representation r for image retrieval, a fusion layer 500 performs a feature-level fusion using representations $r_{tl}$ and $r_{apl}$ extracted from the two trained networks, one trained using the triplet loss 300 and the other trained using the AP loss 400. To obtain a single representation, the feature-level fusion is performed by concatenating both as $\check{r}=[r_{tl}; r_{apl}]$. Then $\check{r}$ is $l_2$-normalized to obtain r. The ensemble image representation r is used in retrieving an image from a database 600.

Below the comparison of the performance of both individual representations and their ensemble is discussed in more detail.

Each database image is cropped as will be described in more detail below and an image representation d is extracted using the combined trained networks.

To conduct a query, the query image is cropped using its ground-truth bounding box and its representation q is extracted using the retrieval model. The similarity between query descriptor q and database descriptor $d_i$ is computed as the inner product between their embeddings:

$$sim(q, d_i) = q^T d_i$$

These similarity scores can then be sorted to return a list of decreasingly relevant database items.

The above described approach was tested as described below. In the test, two datasets were utilized, ModaNet and Exact Street2Shop.

ModaNet is a large-scale dataset that contains street images of fashion items. The dataset consists of a total of 55,176 images and provides polygon labels for 13 categories of clothing items. The dataset currently contains annotations only for the training split of the dataset. Therefore, for testing, 5% of the training images were chosen randomly to use as a validation set. It is noted that ModaNet does not contain product identification information, and thus, ModaNet cannot be used to train and/or evaluate retrieval models. ModaNet was therefore used only to train the clothing item detector.

The Exact Street2Shop dataset contains over 400,000 shop images, over 20,000 "street" images, and images have been labelled with 11 different clothing categories. In addition, the query images have been annotated with bounding boxes of clothing items.

Though the Exact Street2Shop dataset contains bounding boxes for the query items, there are only roughly 40,000 of boxes as compared to the ModaNet, which contains 55,000 images each labeled with various piece of clothing. Thus, a Mask R-CNN clothing item detector was trained using the ModaNet dataset.

In order to ensure the quality of the detector, average precision (AP) loss at 50% Intersection over Union (IoU) metric was used to evaluate its performance. Though the validation sets are not equivalent and results not directly comparable, the detector achieves similar overall and per-category quantitative performance as compared to conventional models. In particular, the above described clothing item detector achieved an overall mean AP of 0.893, as compared 0.82 mAP in the conventional models. The Mask R-CNN model included a Feature Pyramid Network (FPN) backbone based on the ResNext-101 architecture.

In the retrieval test, the following aspects were explored: (a) the effect of using the fine-grained clothing item detector to crop database images on the retrieval accuracy; (b) a comparison of the triplet and AP losses; and (c) the effect of combining learned representations on the retrieval performance.

The tests were restricted to within category retrieval. For each set of experiments, we report mean average precision and top-k retrieval accuracy (Acc@K), defined by:

$$Acc@K = \frac{1}{N}\sum_{i=1}^{N} 1[S_q^+ \cap S_q^K]$$

where $1[S_q^+ \cap S_q^K]$ is an indicator function that equals 1 if the set of the top-K retrieval images contains a database image that matches the product identification of the query image.

The retrieval models and both losses are implemented in Python using the PyTorch framework. During training each image either has its smallest side (AP loss) or largest side (triplet loss) re-sized to 800 pixels and is augmented with the following set of image transformations: color distortion, random tilting, random skew, and random cropping to 800×800 (AP loss).

Each retrieval model was initialized with the network weights pre-trained on the ImageNet dataset, fine-tuned for the ID classification task, and trained until convergence on the final task of cross-domain retrieval. For the triplet loss, a weight update scheme was used, which allows for use of high-resolution images in training of the network. Given an image triplet, the gradients of L with respect to q, $d^+$, and $d^-$ are computed sequentially and aggregated over the triplet and the batch of size b.

For the AP loss, another weight update scheme was utilized, allowing for use of large images and arbitrary batch sizes.

For both the triplet and AP losses, images from arbitrary categories were used in mini-batches. That is, the training was not done on a per-category basis, but category information was ignored during the retrieval training phase to train a single model. This model was then applied on a per-category basis during the testing phase.

Table 1 of FIG. 8 shows comparison of the mAP, Top-1, and Top-20 retrieval accuracy for the Exact Street2Shop dataset. The first four models represent the ablation tests in which the loss functions and database images were varied. The notation, Tri or mAP, indicate whether a triplet loss or AP loss, respectively, was used in training of the network. The notation, DB F or DB C, indicates whether the database images were un-cropped or cropped, respectively.

The last four columns of Table 1 show the results for the various ensemble representations considered in the tests. More specifically, Table 1 identifies each ensemble and models the ensemble combines in parentheses: Tris (Tri DB F/Tri DB C), mAPs (mAP DB F/mAP DB C), Fulls (Tri DB F/mAP DB F), and Crops (Tri DB C/mAP DB C). The best models are highlighted in bold for both single (first four columns) and ensemble models (last four columns).

In the first set of ablation tests, the effect of obtaining the database crops on the learned representations was explored. When comparing column 1 to column 2 and column 3 to column 4 of Table 1 of FIG. 8, the data in Table 1 demonstrates that, on average, cropping the database images aids the retrieval when trained with both the triplet loss and the AP loss. The performance gain is found to be more significant for the AP loss (columns 3 and 4).

In particular, significant improvements were realized in retrieval performance for the eye-wear and pants categories, which are often modeled by a person or with a mannequin.

Despite the good detector performance in the footwear category, the triplet loss loses some performance. The AP loss improves by 2% in retrieval accuracy (footwear category results of columns 3 and 4), which is still worse than the triplet loss.

This can be explained by examining the database images for the footwear category and seeing that most of the images are already very clean photos displaying the particular shoe product on a simple background, and thus there is not much to be gained by further cropping the image. Similarly, little to no improvement is seen in retrieval accuracy in categories that often occupy a large portion of the image, such as dresses, skirts, and tops.

In the second set of ablation tests, the effect of different training loss functions on the learning process was explored. Table 1 of FIG. 8 shows that training the retrieval network with the AP loss achieves similar results in terms of mAP and Top-1 retrieval accuracy; however, Table 1 of FIG. 8 shows that networks trained with the AP loss show worse results in terms of Top-20 retrieval accuracy.

This may be explained because the AP loss has a small gradient for mis-ranked images later in the ranking (as such images have a small impact on the AP) and therefore the supervisory signal to the model during training is weak. This is perhaps mitigated by using detection, as Table 1 of FIG. 8 shows that the drop in Top-20 accuracy from triplet to AP loss is much lower when the database images are cropped.

As noted above, Table 1 of FIG. 8 shows results for different ensembles. Noticeable improvements in mAP, Top-1 and Top-20 accuracy in all cases are observed. Significant improvement can be obtained when two models trained with different losses are combined. Ensembles of models trained with either the triplet or AP loss, with either cropped and un-cropped images, improve the performance over their respective single models with cropped database images.

As demonstrated in Table 1, a more significant improvement is achieved when one of the models is trained with the triplet and the other with the AP loss. When combining models trained using the AP loss and triplet loss (and each trained with cropped images), absolute improvements of 3.5% mAP, 4.5% Top-1 accuracy, and 2.8% Top-20 accuracy are shown when compared with the best individual model trained on cropped images.

Figure 9:
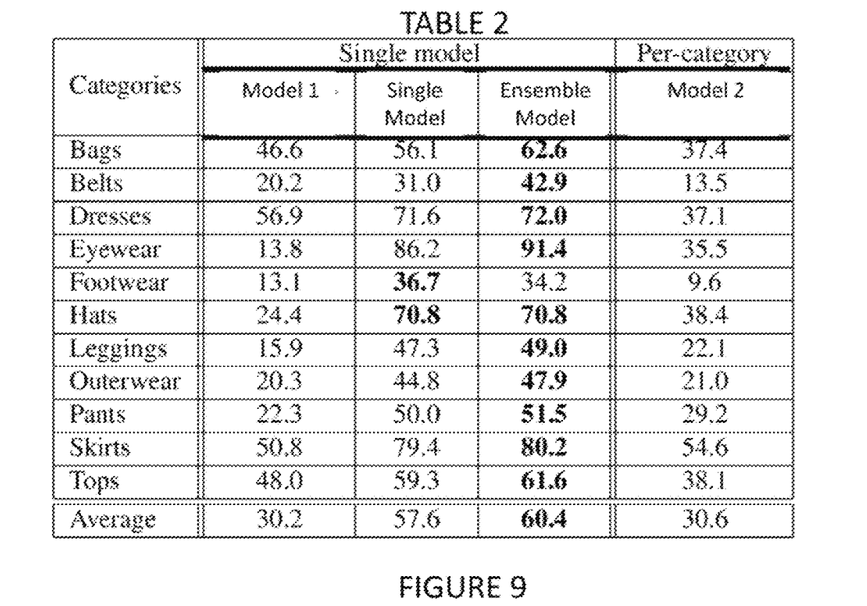
FIG. 9 illustrates a table showing comparison of single and ensemble models to the conventional models on the Street2Shop dataset.

Table 2 of FIG. 9 compares the best single and ensemble models of Table 1 to the Model 1 (trained a single model for all categories as described by Wang, Xi et al. in 'Matching User Photos to Online Products with Robust Deep Features,' In *Proceedings of the* 2016 *ACM on International Conference on Multimedia Retrieval-ICMR* '16, 7-14. New York, N.Y., USA: ACM Press, 2016) or Model 2 (used a set of models that were fine-tuned per category as described by Kiapour, M. Hadi et al. in 'Where to Buy It: Matching Street Clothing Photos in Online Shops,' In 2015 *IEEE International Conference on Computer Vision (ICCV)*, 3343-51. Santiago, Chile: IEEE, 2015). Both of the single and ensemble models, as described above, perform significantly better in terms of Top-20 retrieval accuracy per-category as well as overall.

Figure 10:
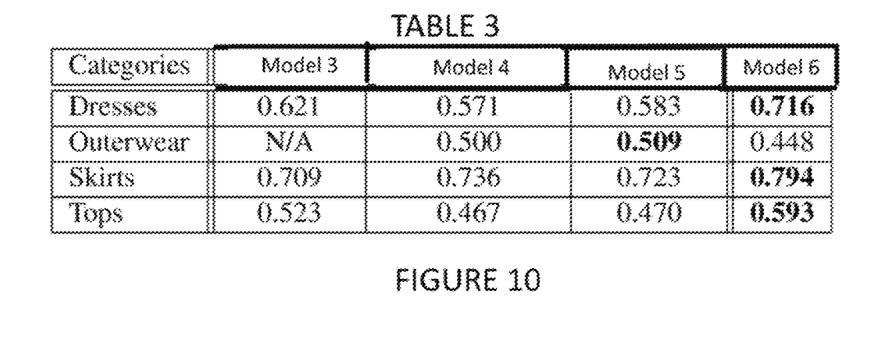
FIG. 10 illustrates a table showing comparison of the Top-20 retrieval accuracy for various methods which considered a subset of the categories.

Table 3 of FIG. 10 compares the best single model of Table 1 (Model 6) with works that only trained and evaluated their models on a subset of the categories of the Exact Street2Shop dataset. Model 6 outperforms the results of Model 3 (a model as described by Wang, Z. et al. in 'Clothing Retrieval with Visual Attention Model,' In 2017 *IEEE Visual Communications and Image Processing (VCIP)*, 1-4, 2017) and Model 4 and Model 5 (models as described by Xiong, Y. et al. in 'A Parameter Partial-Sharing CNN Architecture for Cross-Domain Clothing Retrieval,' In 2016 *Visual Communications and Image Processing (VCIP)*, 1-4, 2016) for the dresses, skirts, and tops categories. It is noted that Note that Models 3-5 train separate models for each category.

As described above, the models provide a memory-efficient detect-then-retrieve framework for cross-modal fashion image retrieval, which consists of fine-grained clothing detection followed by retrieval. The above-described approach outperforms category-specific models. Additionally, the retrieval performance of the above-described models show that the triplet and AP loss are complementary and, when combined, lead to significant performance gains.

In summary, a network ensemble for generating an ensemble image representation for cross-domain retrieval of a fashion item image from a database, includes a three-stream Siamese triplet loss trained convolutional neural network for generating a first retrieval descriptor corresponding to an inputted query image; an average precision loss trained convolutional neural network for generating a second retrieval descriptor corresponding to the inputted query image; and a fusion layer, operatively connected to the three-stream Siamese triplet loss trained convolutional neural network and the average precision loss trained convolutional neural network, for generating an ensemble image representation by concatenating both the first retrieval descriptor and the second retrieval descriptor and $l_2$-normalizing the concatenated result.

The three-stream Siamese triplet loss trained convolutional neural network may be trained by taking a plurality of triplets of fashion item images, where each triplet contains a fashion item query image, a positive fashion item image corresponding to the same item as in the fashion item query image, and a negative fashion item image corresponding to a different item as in the fashion item query image; computing the triplet loss for each of the triplets; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets, using backpropagation, to determine trained values of a plurality of parameters of the convolutional neural network.

The average precision loss trained convolutional neural network may be trained by computing descriptors of all batch fashion item images and discarding intermediary tensors; computing the score matrix S, the $mAP_Q$ loss, and the gradient of the loss with respect to the descriptors; and for a given fashion item image in the batch, computing a descriptor, storing the intermediary tensors, and using the computed gradient for the descriptor to continue the back-propagation through the convolutional neural network.

The fashion item images in the database may be cropped.

The three-stream Siamese triplet loss trained convolutional neural network may be trained using cropped fashion item images.

The average precision loss trained convolutional neural network may be trained using cropped fashion item images.

A method for generating an ensemble image representation for cross-domain retrieval of a fashion item image from a database includes (a) using a three-stream Siamese triplet loss trained convolutional neural network to generate a first retrieval descriptor corresponding to an inputted query image; (b) using an average precision loss trained convolutional neural network to generate a second retrieval descriptor corresponding to the inputted query image; (c) concatenating both the first retrieval descriptor and the second retrieval descriptor; and (d) $l_2$-normalizing the concatenated result to generate the ensemble image representation.

The three-stream Siamese triplet loss trained convolutional neural network may be trained by taking a plurality of triplets of fashion item images, where each triplet contains a fashion item query image, a positive fashion item image corresponding to the same item as in the fashion item query image, and a negative fashion item image corresponding to a different item as in the fashion item query image; computing the triplet loss for each of the triplets; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets, using back propagation, to determine trained values of a plurality of parameters of the convolutional neural network.

The average precision loss trained convolutional neural network may be trained by computing descriptors of all batch fashion item images and discarding intermediary tensors; computing the score matrix S, the $mAP_Q$ loss, and the gradient of the loss with respect to the descriptors; and for a given fashion item image in the batch, computing a descriptor, storing the intermediary tensors, and using the computed gradient for the descriptor to continue the backpropagation through the convolutional neural network.

The fashion item images in the database may be cropped.

The three-stream Siamese triplet loss trained convolutional neural network may be trained using cropped fashion item images.

The average precision loss trained convolutional neural network may be trained using cropped fashion item images.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A network ensemble for generating an ensemble image representation for cross-domain retrieval of a fashion item image from a database, the network ensemble accompanied by a processor and a memory, comprising:
   a three-stream Siamese triplet loss trained convolutional neural network for generating a first retrieval descriptor corresponding to an inputted query image;
   an average precision loss trained convolutional neural network for generating a second retrieval descriptor corresponding to the inputted query image; and
   a fusion layer, operatively connected to said three-stream Siamese triplet loss trained convolutional neural network and said average precision loss trained convolutional neural network, for generating an ensemble image representation by concatenating both said first retrieval descriptor and said second retrieval descriptor and $l_2$-normalizing the concatenated result;
   said three-stream Siamese triplet loss trained convolutional neural network being trained by taking a plurality of triplets of fashion item images, where each triplet contains a fashion item query image, a positive fashion item image corresponding to the same item as in the fashion item query image, and a negative fashion item image corresponding to a different item as in the fashion item query image; computing the triplet loss for each of the triplets; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets, using backpropagation, to determine trained values of a plurality of parameters of the convolutional neural network.

2. The network ensemble of claim 1, wherein said average precision loss trained convolutional neural network is trained by computing descriptors of all batch fashion item images and discarding intermediary tensors; computing the score matrix S, the $mAP_Q$ loss, and the gradient of the loss with respect to the descriptors; and for a given fashion item image in the batch, computing a descriptor, storing the intermediary tensors, and using the computed gradient for the descriptor to continue the backpropagation through the convolutional neural network.

3. The network ensemble of claim 1, wherein fashion item images in the database are cropped.

4. The network ensemble of claim 1, wherein said three-stream Siamese triplet loss trained convolutional neural network is trained using cropped fashion item images.

5. The network ensemble of claim 2, wherein said average precision loss trained convolutional neural network is trained using cropped fashion item images.

6. A method for generating an ensemble image representation for cross-domain retrieval of a fashion item image from a database, comprising:
   (a) training a three-stream Siamese triplet loss trained convolutional neural network by taking a plurality of triplets of fashion item images, where each triplet contains a fashion item query image, a positive fashion item image corresponding to the same item as in the fashion item query image, and a negative fashion item image corresponding to a different item as in the fashion item query image; computing the triplet loss for each of the triplets; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets, using back propagation, to determine trained values of a plurality of parameters of the convolutional neural network;
   (b) using the three-stream Siamese triplet loss trained convolutional neural network to generate a first retrieval descriptor corresponding to an inputted query image;
   (c) using an average precision loss trained convolutional neural network to generate a second retrieval descriptor corresponding to the inputted query image;
   (d) concatenating both the first retrieval descriptor and the second retrieval descriptor; and
   (e) $l_2$-normalizing the concatenated result to generate the ensemble image representation.

7. The method of claim 6, wherein the average precision loss trained convolutional neural network is trained by computing descriptors of all batch fashion item images and discarding intermediary tensors; computing the score matrix S, the $mAP_Q$ loss, and the gradient of the loss with respect to the descriptors; and for a given fashion item image in the batch, computing a descriptor, storing the intermediary tensors, and using the computed gradient for the descriptor to continue the backpropagation through the convolutional neural network.

8. The method of claim 6, wherein fashion item images in the database are cropped.

9. The method of claim 6, wherein the three-stream Siamese triplet loss trained convolutional neural network is trained using cropped fashion item images.

10. The method of claim 7, wherein the average precision loss trained convolutional neural network is trained using cropped fashion item images.

11. A system for generating an ensemble image representation for cross-domain retrieval of a fashion item image from a database comprising:
one or more processors; and
a memory including a network ensemble;
said network ensemble including,
  a three-stream Siamese triplet loss trained convolutional neural network for generating a first retrieval descriptor corresponding to an inputted query image,
  an average precision loss trained convolutional neural network for generating a second retrieval descriptor corresponding to the inputted query image, and
  a fusion layer, operatively connected to said three-stream Siamese triplet loss trained convolutional neural network and said average precision loss trained convolutional neural network, for generating an ensemble image representation by concatenating both said first retrieval descriptor and said second retrieval descriptor and $l_2$-normalizing the concatenated result;
said average precision loss trained convolutional neural network being trained by computing descriptors of all batch fashion item images and discarding intermediary tensors; computing the score matrix S, the $mAP_Q$ loss, and the gradient of the loss with respect to the descriptors; and for a given fashion item image in the batch, computing a descriptor, storing the intermediary tensors, and using the computed gradient for the descriptor to continue the backpropagation through the convolutional neural network.

12. The system of claim 11, wherein said three-stream Siamese triplet loss trained convolutional neural network is trained by taking a plurality of triplets of fashion item images, where each triplet contains a fashion item query image, a positive fashion item image corresponding to the same item as in the fashion item query image, and a negative fashion item image corresponding to a different item as in the fashion item query image; computing the triplet loss for each of the triplets; ranking the triplets by the triplet loss computed; selecting a subset of triplets among the plurality of triplets, the subset of triplets having the largest computed loss among the plurality of triplets; and retraining the pre-trained convolutional neural network on each of the triplets of the subset of triplets, using backpropagation, to determine trained values of a plurality of parameters of the convolutional neural network.

13. The system of claim 11, wherein fashion item images in the database are cropped.

14. The system of claim 12, wherein said three-stream Siamese triplet loss trained convolutional neural network is trained using cropped fashion item images.

15. The system of claim 11, wherein said average precision loss trained convolutional neural network is trained using cropped fashion item images.

* * * * *